(12) United States Patent
Bates et al.

(10) Patent No.: US 7,724,631 B2
(45) Date of Patent: May 25, 2010

(54) REFLECTIVE HOLOGRAPHIC STORAGE MEDIA WITH CONTROL INFORMATION IN UNDERLYING DVD REFLECTIVE LAYER

(75) Inventors: Allen K. Bates, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 11/674,441

(22) Filed: Feb. 13, 2007

(65) Prior Publication Data

US 2008/0196050 A1    Aug. 14, 2008

(51) Int. Cl.
G11B 7/00 (2006.01)
(52) U.S. Cl. ...................................... 369/103
(58) Field of Classification Search .............. 369/103, 369/275.1, 275.3, 53.22, 47.51, 47.53, 94
See application file for complete search history.

(56) References Cited

U.S. PATENT DOCUMENTS

| | | | |
|---|---|---|---|
| 7,158,274 B2 * | 1/2007 | Kim | 359/32 |
| 7,206,108 B2 * | 4/2007 | Tsukagoshi | 359/35 |
| 7,423,955 B2 * | 9/2008 | Tieke et al. | 369/275.3 |
| 7,433,293 B2 * | 10/2008 | Horimai et al. | 369/275.1 |
| 7,512,054 B2 * | 3/2009 | Matsumoto et al. | 369/103 |
| 2007/0047421 A1 * | 3/2007 | Usami | 369/103 |

* cited by examiner

*Primary Examiner*—Nabil Z Hindi
(74) *Attorney, Agent, or Firm*—Rabindranath Dutta; Konrad Raynes & Victor LLP

(57) ABSTRACT

A holographic storage media incorporates a holographic recording layer for storing holographic data and a DVD reflective layer for storing control information. The DVD reflective layer is positioned within the holographic storage media relative to the holographic recording layer to enable individual optical access to the holographic recording layer via a data laser light for processing the holographic data and individual optical access to the DVD reflective layer via an information laser light for processing the control information. The holographic recording layer and the DVD reflective layer may be physically separated by one or more intermediate reflective layers. The data laser light and the information laser light may differ in one or more optical characteristics. The holographic recording layer and the DVD reflective layer may be optically accessed by the respective laser lights through different light transparent faces of the holographic storage media.

16 Claims, 3 Drawing Sheets

REFLECTIVE HOLOGRAPHIC STORAGE MEDIA WITH CONTROL INFORMATION IN UNDERLYING DVD REFLECTIVE LAYER

FIELD OF THE INVENTION

The present invention generally relates to holographic storage media (e.g., holographic disks). The present invention specifically relates to holographic storage media having a holographic recording layer for storing holographic data and a digital versatile disk ("DVD") layer for storing control information (e.g., calibration information and servo information).

BACKGROUND OF THE INVENTION

To provide reliable performance of holographic data storage drives, it may be necessary to perform periodic calibration of the writing and reading parameters for drives depending upon various conditions (e.g., environment, media, etc.). For example, when data is written on holographic media, the laser power may need to be adjusted for optimum read/write performance. Prior art solutions typically do not dynamically optimize the laser power for different media and environmental conditions, resulting in less than optimum performance. In addition, prior art solutions do not provide a mechanism to store the calibration information separate from the data recording layer on the same physical media.

SUMMARY OF THE INVENTION

The present invention provides a new and unique holographic storage media comprising a holographic recording layer for storing holographic data and a DVD reflective layer for storing control information (e.g., calibration information and/or servo information). The DVD reflective layer is positioned within the holographic storage media relative to the holographic recording layer wherein the holographic recording layer is individually optically accessible by a data laser light for processing (i.e., reading and/or writing) the holographic data and wherein the DVD reflective layer is individually optically accessible by an information laser light for processing (i.e. reading and/or writing) the control information.

In one form of the holographic storage media, the holographic recording layer and the DVD reflective layer are physically separated by one or more intermediate reflective layers (e.g., a dichroic mirror layer or a reflective separation layer).

In a second form of the holographic storage media, the data laser light and the information laser light are different in one or more optical characteristics (e.g., wavelength, focal point, polarization, etc.).

In a third form of the holographic storage media, the holographic recording layer and the DVD reflective layer may be optically accessed by the respective laser lights through different light transparent faces of the holographic storage media.

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
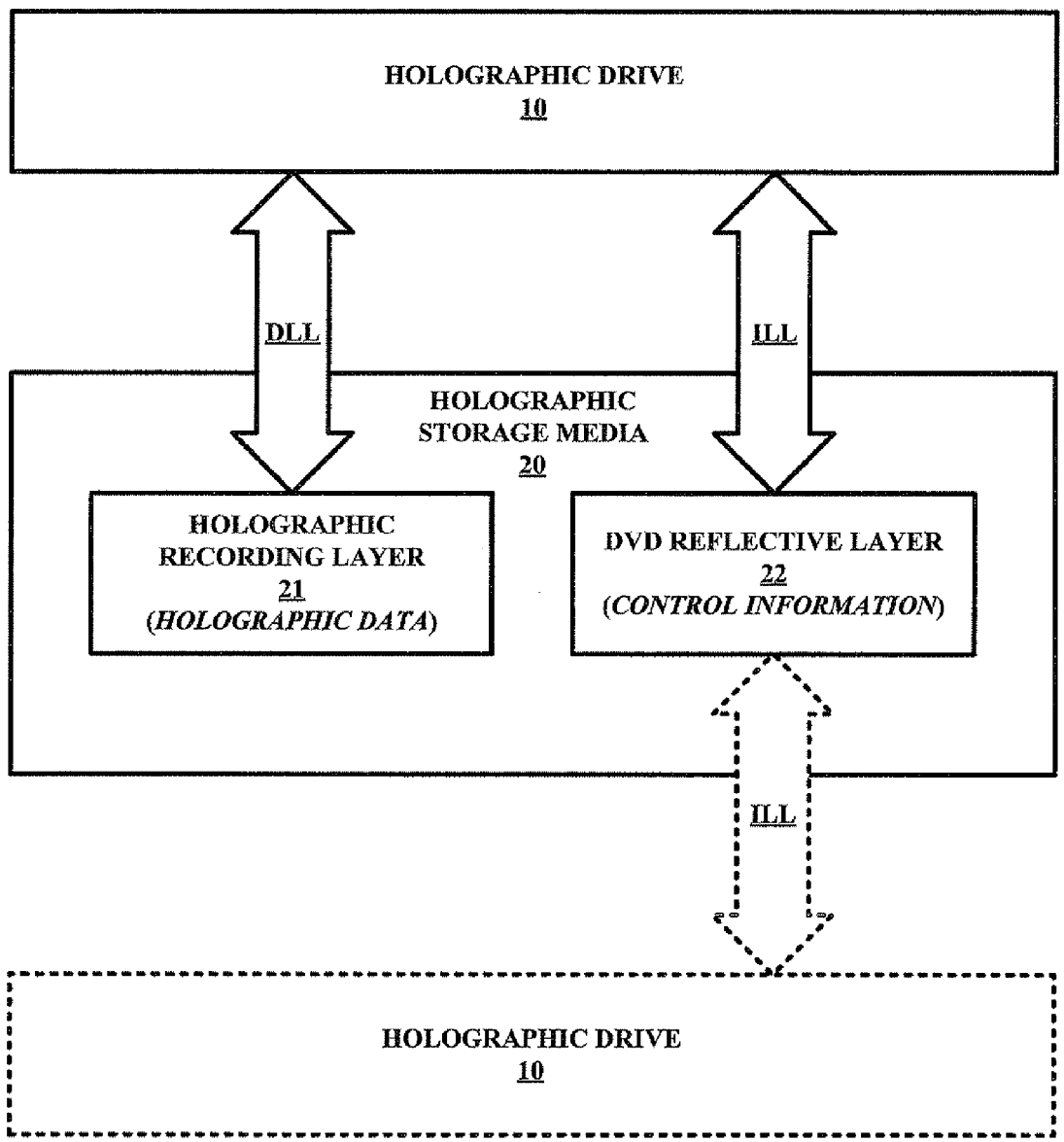
FIG. 1 illustrates a holographic system in accordance with the present invention.

FIG. 1 illustrates a holographic system of the present invention employing a holographic drive 10 and a holographic storage media 20. Holographic drive 10 is structurally configured to emit a data laser light DLL and to detect a transmission or a reflection of data laser light DLL by media 20 through a holographic recording layer 21 of media 20 whereby data laser light DLL is used by drive 10 for processing (i.e., reading and/or writing) holographic data of layer 21. Holographic drive 10 is further structurally configured to emit an information laser light ILL and to detect a reflection of information laser light ILL by a DVD reflective layer 22 of media 20 whereby information laser light ILL is used by drive 10 for processing (i.e., reading and/or writing) control information of layer 21.

The holographic data is information in holographic form that is intended to be viewed and/or manipulated by a user/owner of media 20 via drive 10. By comparison, the control information is information in DVD form used by drive 10 in support of processing the holographic data. In one exemplarily control information embodiment, the control information includes calibration information in the form of characteristics of holographic drive 10 or any other/additional holographic drive that wrote the hologram data for each sector or section of layer 21 (i.e., more than one holographic drive may write different portions of media 20). The characteristics of the holographic drive(s) include, but are not limited to, laser power, wavelength(s), know aberration conditions, rotation speed of holographic storage media, number of data sets in one physical location (i.e. one sector) along a particular axis of a holographic storage media (e.g., a z-axis of media 20 in the form of a disk), the increment of distance along a particular axis of a holographic storage media that each of a multiple data set is written, the date-time stamp of when the hologram data was written to the holographic storage media, and diagnostic information regarding soft error conditions existing in the holographic drive(s) that wrote the data.

For example, in one calibration information based embodiment, laser power calibration information includes the laser power used to write a portion and/or all holographic data 38. Alternatively or concurrently, the laser power calibration information includes the optimum laser power for reading a portion and/or all holographic data 38. In such a case, the optimum laser power is calculated based on measuring an actual read performance while varying the laser power or other methods.

In a second calibration information based embodiment. laser wavelength calibration information includes the optimum laser wavelength for reading and/or writing a portion and/or all holographic data 38. In such a case, the optimum laser power is calculated based on measuring an actual read performance while varying the laser wavelength or other methods.

In a third calibration information based embodiment, known aberration conditions calibration information includes the optical aberrations (e.g., astigmatism, spherical aberration, coma, etc.) affecting the optical beam used for writing and/or reading a portion and/or all holographic data 38. In such a case, the optimum aberrations are calculated based on measurements, manufacturing data and/or other methods. Know aberration conditions calibration information may vary with drives, media and/or environmental conditions (e.g, temperature, humidity, etc.).

In a fourth calibration information based embodiment, the rotation speed of holographic storage media calibration information includes the relative linear velocity of data storage media 20 with respect to data laser light DLL.

In a fifth calibration information based embodiment, the number of data sets in one physical location calibration information includes data sets in the same physical location (e.g., by a change in the recording wavelength, angle of the recording beam, etc.), and/or number of data sets in one physical location (i.e. one sector) along a particular axis of a holographic storage media (e.g., a z-axis of media 20 in the form of a disk).

In a sixth calibration information based embodiment, diagnostic information regarding soft error conditions existing in the holographic drive(s) that wrote the data calibration information includes the ECC (error correction code) used for writing and/or reading a portion and/or all holographic data 38.

In a second exemplarily control information embodiment, the control information includes calibration information in the form of encryption information (e.g., an encryption key for the holographic data, or the type of encryption used for the holographic data).

In a third exemplarily control information embodiment, the control information includes servo information for aiding a servo control of holographic drive 10 in tracking media 20 during a reading or writing of the holographic data in layer 21. In certain embodiments, servo information includes tracking and/or focusing information indicating the exact location of a portion and/or all of the data stored on media 20 in the form of a disk.

A premise of the present invention is that layers 21 and 22 are individually optically accessible by respective laser lights DLL and ILL (i.e., neither laser light is used to optically access both layers 21 and 22). This can be accomplished in a variety of designs of drive 10 and/or media 20 in accordance with the inventive principles of the present invention.

In one exemplarily embodiment, layer 21 and layer 22 are physically separated by one or more intermediate reflective layers (not shown in FIG. 1) to facilitate layer 21 being individually optically accessed by data laser light DLL and layer 22 being individually optical accessed by information laser light ILL. For example, an intermediate reflective layer (e.g., a dichroic mirror layer or a reflective separation layer) can be used to reflect data laser light DLL through holographic recording layer 21 and to reflect data laser light DLL away from accessing DVD reflective layer 22, particularly in view of media 20 having a disk configuration.

In a second exemplarily embodiment, laser lights DLL and ILL differ in one or more optical characteristics to facilitate layer 21 being individually optically accessed by data laser light DLL and layer 22 being individually optically accessed by information laser light ILL. Such optical characteristics include, but are not limited to, wavelength, focal point and polarization. For example, a wavelength of data laser light DLL may be different than the wavelength of information laser light ILL, a focal point of data laser light DLL may be different than a focal point of information laser light ILL, and/or a polarization of data laser light DLL may be different than a polarization of information laser light ILL.

In a third exemplarily embodiment, media 20 has an exterior surface including two or more physically separate light transparent faces and holographic drive 10 emits laser lights DLL and ILL through different light transparent faces of media 20. For example, drive 10 is shown in FIG. 1 as emitting laser lights DLL and ILL through a top light transparent face of media 20. Alternatively, as indicated by the dashed lines, drive 10 can emit information laser light ILL through a bottom light transparent face of media 20.

In practice, the present invention does not impose any restrictions or any limitations to the structural configurations of a holographic drive and a holographic storage media in accordance with the present invention other than configuring a holographic recording layer and a DVD reflective layer of the holographic storage media in a manner that facilitates individual optical access to the layers by different laser lights emitted by a holographic drive. Thus, in connection with FIGS. 2 and 3, the following description of exemplary embodiments of drive 10 (FIG. 1) and media 20 (FIG. 1) does not restrict or limit the structural configurations of a holographic drive and a holographic storage media in accordance with the present invention.

Figure 2:
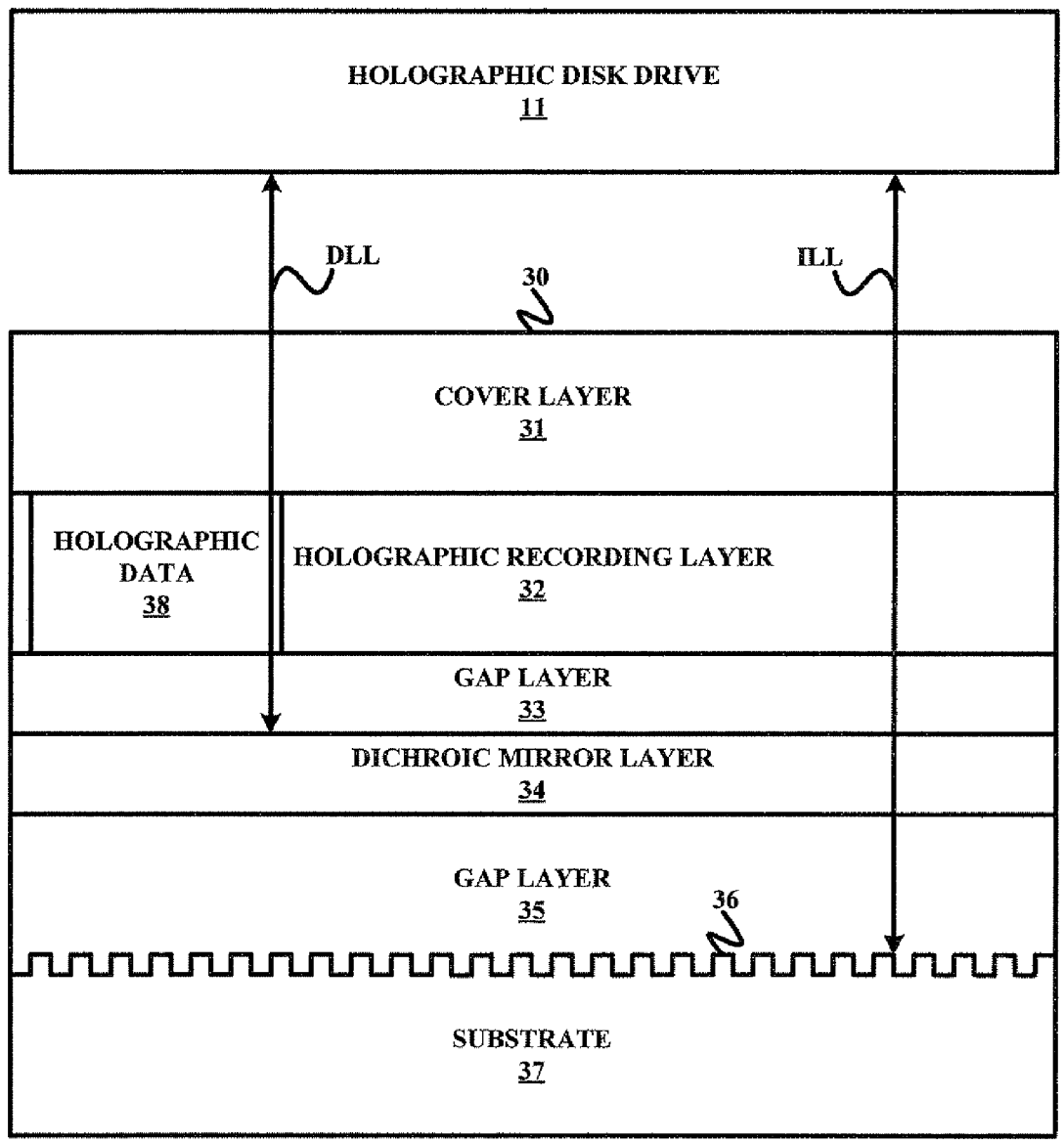
FIG. 2 illustrates a first exemplarily embodiment of the holographic system illustrated in FIG. 1 in accordance with the present invention.

FIG. 2 illustrates a holographic disk drive 11 and a holographic disk 30. Holographic disk 30 employs a light transparent cover layer 31, a holographic recording layer 32, a gap layer 33, a dichroic mirror layer 34, a gap layer 35, a DVD reflective layer 36 and a substrate 37. In one embodiment, DVD reflective layer 36 includes lands and grooves coated with a phase-change media to make layer 36 into a recordable layer for writing control information (e.g., a DVD-R or a DVD-RW).

In operation, drive 11 emits a data laser light DLL through layers 31-33 that is reflected by layer 34 back through layers 31-33 whereby holographic data 38 within layer 32 can be processed (i.e., read and/or written) by drive 11. The reflection of data laser light DLL by layer 34 prevents data laser light DLL from being reflected by layer 36. In one exemplarily embodiment, data laser light DLL is a blue laser light with a 405 nm wavelength. In a second exemplarily embodiment, data laser light DLL is a green laser light with a 514 nm or 532 nm wavelength.

By comparison, drive 11 emits an information laser light ILL through layers 31-35 that is reflected by layer 36 back through layers 31-35 whereby control information of layer 36 is processed (i.e., read and/or written) by drive 11. Holographic recording layer 32 is unaffected by information laser light ILL and dichroic mirror layer 35 is selectively transparent to the wavelength of information laser light ILL to enable information laser light to access DVD layer 36. In one exemplarily embodiment, information laser light ILL is a red laser light with a 680 nm wavelength.

Figure 3:
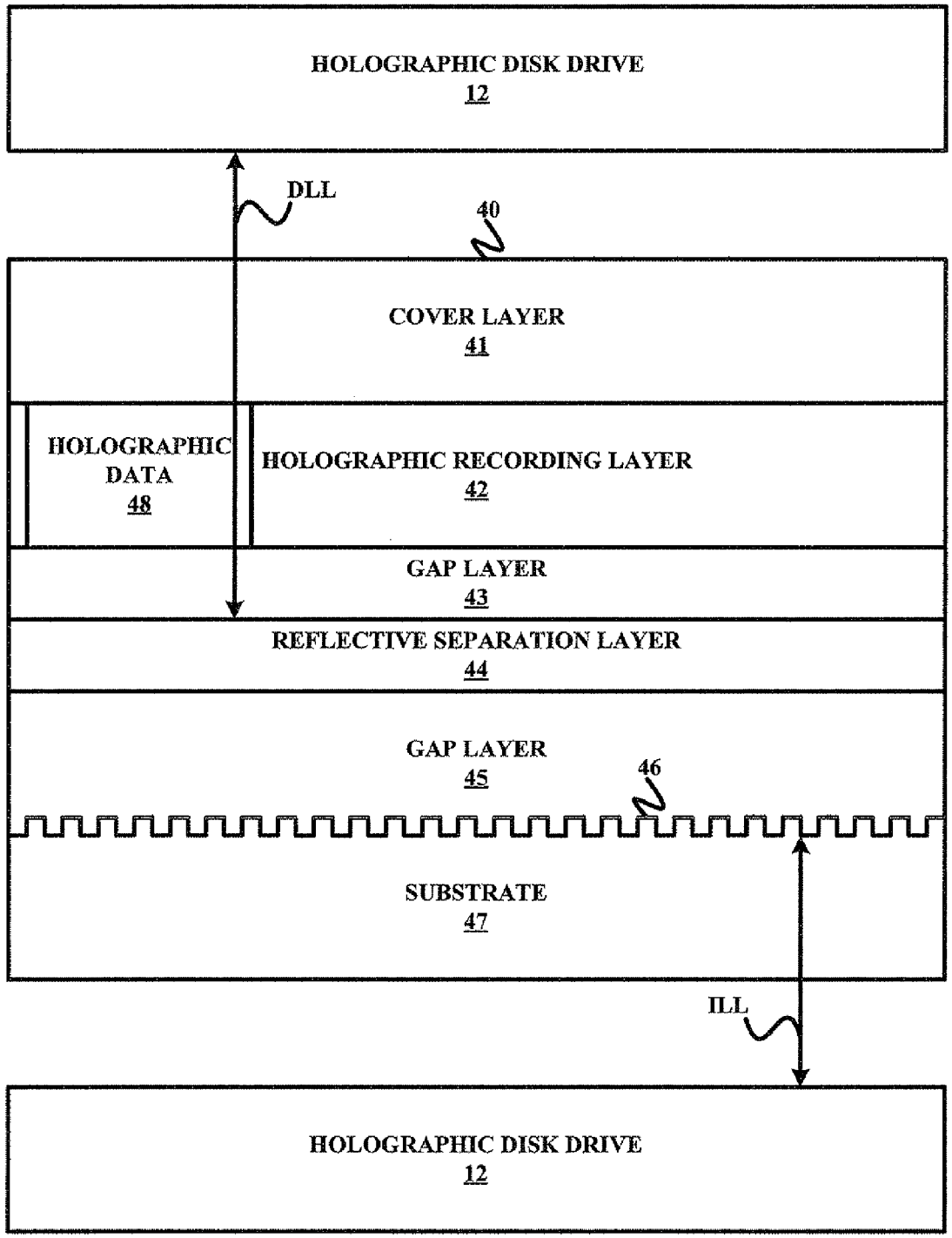
FIG. 3 illustrates a second exemplarily embodiment of the holographic system illustrated in FIG. 1 in accordance with the present invention.

FIG. 3 illustrates a holographic disk drive 12 and a holographic disk 40. Holographic disk 40 employs a light transparent cover layer 41, a holographic recording layer 42, a gap layer 43, a reflective separation layer 44, a gap layer 45, a DVD reflective layer 46 and a substrate 47. In one embodiment, DVD reflective layer 46 includes lands and grooves coated with a phase-change media to make layer 46 into a recordable layer for writing control information (e.g., a DVD-R or a DVD-RW).

In operation, drive 12 emits a data laser light DLL through layers 41-43 that is reflected by layer 44 back through layers 41-43 whereby holographic data 48 within layer 42 can be processed (i.e., read and/or written) by drive 12. The reflection of data laser light DLL by layer 44 prevents data laser light DLL from being reflected by layer 46. In one exemplarily embodiment, data laser light DLL is a blue laser light with a 405 nm wavelength. In a second exemplarily embodiment, data laser light DLL is a green laser light with a 514 nm or 532 nm wavelength.

By comparison, drive 12 emits an information laser light ILL through substrate 47 that is reflected by layer 46 back through substrate 47 whereby control information of layer 46 is processed (i.e., read and/or written) by drive 12. In one exemplarily embodiment, information laser light ILL is a red laser light with a 680 nm wavelength.

Referring to FIGS. 1-3, those having ordinary skill in the art will appreciate numerous benefits and advantages of the present invention including, but not limited to, a dual-layer holographic storage media for processing holographic data and control information in an efficient manner.\

Those having ordinary skill in the art of holographic storage media technology may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A holographic storage media, comprising:
    a holographic recording layer for storing holographic data; and
    a DVD reflective layer for storing control information, the DVD reflective layer being positioned within the holographic storage media relative to the holographic recording layer wherein the holographic recording layer is individually optically accessible by a data laser light for processing the holographic data and wherein the DVD reflective layer is individually optically accessible by an information laser light for processing the control information, wherein the control information includes calibration information, and wherein the calibration information includes at least one of holographic drive characteristics and encryption information.

2. The holographic storage media of claim 1, further comprising:
    a dichroic mirror layer between the holographic recording layer and the DVD reflective layer, wherein the dichroic mirror layer is operable to reflect the data laser light and to pass through the information laser light.

3. The holographic storage media of claim 1, further comprising:
    a reflective separation layer between the holographic recording layer and the DVD reflective layer, wherein the reflective separation layer is operable to reflect the data laser light.

4. The holographic storage media of claim 1,
    wherein the data laser light has a first wavelength;
    wherein the information laser light has a second wavelength; and
    wherein the first wavelength and the second wavelength are different.

5. The holographic storage media of claim 1,
    wherein the data laser light has a first focal point;
    wherein the information laser light has a second focal point; and
    wherein the first focal point and the second focal point are different.

6. The holographic storage media of claim 1,
    wherein the data laser light has a first polarization relative to the holographic storage media;
    wherein the information laser light has a second polarization relative to the holographic storage media; and
    wherein the first polarization and the second polarization are different.

7. The holographic storage media of claim 1, wherein the control information includes servo information.

8. A holographic storage media, comprising:
    a holographic recording layer for storing holographic data; and
    a DVD reflective layer for storing control information, the DVD reflective layer being positioned within the holographic storage media relative to the holographic recording layer wherein the holographic recording layer is individually optically accessible by a data laser light for processing the holographic data and wherein the DVD reflective layer is individually optically accessible by an information laser light for processing the control information,
        wherein the holographic storage media has an exterior surface including a plurality of physically separate light transparent faces;
        wherein the holographic recording layer is individually optically accessible by the data laser light through a first light transparent face of the holographic storage media; and
        wherein the DVD reflective layer is individually optically accessible by the information laser light on a second light transparent face of the holographic storage media.

9. A holographic system, comprising:
    a holographic storage media including
        a holographic recording layer for storing holographic data, and
        a DVD reflective layer for storing control information, the DVD reflective layer being positioned within the holographic storage media relative to the holographic recording layer wherein the holographic recording layer is individually optically accessible by a data laser light for processing the holographic data and wherein the DVD reflective layer is individually optically accessible by an information laser light for processing the control information; and
    a holographic drive operable to emit the data laser light and the information laser light, wherein the control information includes calibration information, and wherein the calibration information includes at least one of holographic drive characteristics and encryption information.

10. The holographic system of claim 9, further comprising:
    a dichroic mirror layer between the holographic recording layer and the DVD reflective layer, wherein the dichroic mirror layer is operable to reflect the data laser light and to pass through the information laser light.

11. The holographic system of claim 9, further comprising:
    a reflective separation layer between the holographic recording layer and the DVD reflective layer, wherein the reflective separation layer is operable to reflect the data laser light.

12. The holographic system of claim 9,
    wherein the data laser light has a first wavelength;
    wherein the information laser light has a second wavelength; and wherein the first wavelength and the second wavelength are different.

13. The holographic system of claim 9,
   wherein the data laser light has a first focal point;
   wherein the information laser light has a second focal point; and
   wherein the first focal point and the second focal point are different.

14. The holographic system of claim 9,
   wherein the data laser light has a first polarization;
   wherein the information laser light has a second polarization; and
   wherein the first polarization and the second polarization are different.

15. The holographic system of claim 9, wherein the control information includes servo information.

16. A holographic system, comprising:
   a holographic storage media including
      a holographic recording layer for storing holographic data, and
      a DVD reflective layer for storing control information, the DVD reflective layer being positioned within the holographic storage media relative to the holographic recording layer wherein the holographic recording layer is individually optically accessible by a data laser light for processing the holographic data and wherein the DVD reflective layer is individually optically accessible by an information laser light for processing the control information; and
   a holographic drive operable to emit the data laser light and the information laser light,
      wherein the holographic storage media has an exterior surface including a plurality of physically separate light transparent faces;
      wherein the holographic recording layer is individually optically accessible by the data laser light through a first light transparent face of the holographic storage media; and
      wherein the DVD reflective layer is individually optically accessible by the information laser light on a second light transparent face of the holographic storage media.

* * * * *